United States Patent
Cohen et al.

(10) Patent No.: US 10,898,999 B1
(45) Date of Patent: Jan. 26, 2021

(54) SELECTIVE HUMAN-ROBOT INTERACTION

(71) Applicant: X Development LLC, Mountain View, CA (US)

(72) Inventors: Gabriel A. Cohen, Alameda, CA (US); Benjamin Holson, Sunnyvale, CA (US); Munaf Assaf, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 132 days.

(21) Appl. No.: 15/707,093

(22) Filed: Sep. 18, 2017

(51) Int. Cl.
  *B25J 9/00* (2006.01)
  *G05D 1/00* (2006.01)
  *G06K 9/00* (2006.01)

(52) U.S. Cl.
  CPC .......... *B25J 9/0003* (2013.01); *G05D 1/0088* (2013.01); *G06K 9/00302* (2013.01); *G06K 9/00335* (2013.01)

(58) Field of Classification Search
  CPC ... A61B 1/051; A61B 1/0676; A61B 1/00009; H04N 2005/2255; H04N 5/379; H04N 5/2256; H04N 5/37455; H04N 5/378; H04N 5/37457; H04N 5/3742; H01L 2924/381; H01L 2924/0002; H01L 27/14609; H01L 25/0657; H01L 27/124; H01L 27/14603; H01L 27/14689; H01L 27/1469; H01L 27/14643; H01L 27/14636; H01L 24/17; H01L 27/14641; H01L 27/1464; H01L 27/14638; H01L 27/14618; H01L 27/14634; H01L 27/146; H01L 27/14601; H01L 31/0304; H01L 31/028; H01L 31/0296
  See application file for complete search history.

(56) References Cited

U.S. PATENT DOCUMENTS

| | | | |
|---|---|---|---|
| 7,957,837 B2 | 6/2011 | Ziegler et al. | |
| 8,630,975 B1* | 1/2014 | Guo | G06N 7/005 707/608 |
| 8,918,213 B2* | 12/2014 | Rosenstein | B25J 5/007 700/258 |

(Continued)

OTHER PUBLICATIONS

Generalization and scaling in reinforcement learning, Abstract (Year: 1990).*

(Continued)

*Primary Examiner* — Ian Jen
(74) *Attorney, Agent, or Firm* — Fish & Richardson P.C.

(57) ABSTRACT

Methods, systems, and apparatus, including computer programs encoded on a computer storage medium, for selective human-robot interaction. In some implementations, sensor data describing an environment of a robot is received, and a person in the environment of the robot is detected based on the sensor data. Scores indicative of properties of the detected person are generated based on the sensor data and processed using a machine learning model. Processing the scores can produce one or more outputs indicative of a likelihood that the detected person will perform a predetermined action in response to communication from the robot. Based on the one or more outputs of the machine learning model, the robot initiates communication with the detected person.

20 Claims, 5 Drawing Sheets

(56) References Cited

U.S. PATENT DOCUMENTS

| | | | | |
|---|---|---|---|---|
| 9,014,852 | B2* | 4/2015 | Iba | B25J 9/163 700/245 |
| 9,086,700 | B2* | 7/2015 | Fernando | G05D 1/024 |
| 9,429,934 | B2* | 8/2016 | Mangaser | B25J 9/1689 |
| 2009/0177323 | A1* | 7/2009 | Ziegler | B25J 5/007 700/259 |
| 2011/0160908 | A1* | 6/2011 | Iba | B25J 9/1679 700/262 |
| 2013/0346346 | A1* | 12/2013 | Criminisi | G06N 7/005 706/12 |
| 2014/0249676 | A1* | 9/2014 | Florencio | G06N 3/008 700/259 |
| 2015/0314454 | A1* | 11/2015 | Breazeal | B25J 9/0003 700/259 |

OTHER PUBLICATIONS

Bohus et al. "Learning to Predict Engagement with a Spoken Dialog Systems in Open-World Settings," Proceedings of the SIGDIAL 2009 Conference: The 10$^{th}$ Annual Meeting of the Special Interest Group on Discourse and Dialogue, Association for Computational Linguistics, Sep. 2009, 9 pages.

Hinds et al. "Whose Job is it Anyway? A Study of Human-Robot Interaction in a Collaborative Task," Human-Computer Interaction, vol. 19, Jun. 2004, 31 pages.

Macharet et al. "Learning How to Increase the Change of Human-Robot Engagement," IEEE/RSJ International Conference on Intelligent Robots and Systems, Nov. 3, 2013, 7 pages.

Meisner et al. "Predictive State Representations for Grounding Human-Robot Communication," IEEE International Conference on Robotics and Automation, May 3, 2010, 8 pages.

Perez-D'Arpino et al. "Fast Target Prediction of Human Reaching Motion for Cooperative Human-Robot Manipulation Tasks using Time Series Classification," IEEE International Conference on Robotics and Automation, Washington, May 2015, 8 pages.

Rahbar et al. "Predicting extraversion from non-verbal features during a face-to-face human-robot interaction," International Conference on Social Robotics, Oct. 2015, Paris, France, 11 pages.

Stulp et al. "Facilitating Intention Prediction for Humans by Optimizing Robot Motions," International Conference on Intelligent Robots and Systems, Germany, Sep. 2015, 8 pages.

Unhelkar et al. "Human-Robot Co-Navigation using Anticipatory Indicators of Human Walking Motion," IEEE International Conference on Robotics and Automation, May 2015, 8 pages.

\* cited by examiner

SELECTIVE HUMAN-ROBOT INTERACTION

BACKGROUND

Robots are capable of a wide variety of interactions with people. Different people may desire different levels of interaction with a robot, or no interaction at all, depending on each individual person's preferences and current situation.

SUMMARY

In some implementations, a system can use an incrementally learned model for predicting outcomes when selecting people to interact with a robot. For example, the model may be used to predict whether and when a person would be willing to interact to perform a particular action. In some instances, a robot may need assistance from a human to carry out a task. When the robot is near a crowd, or as people walk by, it would be helpful for the robot to be able to identify the people that are most likely to assist the robot or interact with the robot. The interaction prediction model can use contextual information about a person near a robot to estimate a likelihood that an individual will successfully interact with the robot. For example, the robot can observe a person's speed, direction of movement, facial expressions, body language, and other attributes and provide the information to the interaction prediction model. Based on the relationships learned using many examples of prior interactions between people and robots, the interaction prediction model can provide a score indicating how likely the person is to successfully interact with the robot. The model can also be used to update the scores over time, and the updated scores can be used to determine an appropriate time to initiate contact with a person and/or to vary the manner in which the robot communicates with the person.

A robot can use the interaction prediction model to generate scores for different people observed by the robot. Then, the robot can use the scores to select one or more of the people to interact with, or to identify people to avoid interacting with. Similarly, the results of the interaction prediction model may be used to vary the type of interaction that the robot attempts. For example, several different types of interaction may be possible (e.g., verbal dialog, a wave from a distance, a request to assist the robot, etc.). Different types of interactions may be selected for an individual depending on the interaction score generated for the user. For example, ranges of interaction scores can correspond to different levels of interaction, with higher likelihoods of interaction leading to attempts for greater engagement with the person.

The interaction prediction model can be configured to account for differences for the various type of interactions a robot may attempt to initiate. For example, the definition of a "successful" interaction can vary. Multiple models may be trained to estimate the interaction success for different types of interactions (e.g., a conversation, help lifting a physical object, guiding the robot to a location, etc.). As another example, a single model may be trained to estimate interaction likelihoods for different types of interaction. The desired type of interaction may be provided as input to the model to be used in generating the likelihood of successful interaction.

The interaction prediction model can be trained using logs of past interactions between robots and people. Training examples can include audio and video of a person's approach to the robot, interaction with the robot, and departure from the robot, as well as data indicating inputs to the robot during the encounter. Each training example can include labels indicating the type of action by the person was desired, and whether the person performed the action. The interaction prediction model can be implemented as a neural network or other machine learning model. Based on the accumulated set of training examples, the interaction prediction model learns what characteristics are predictive of successful interactions, so the model can use information about those characteristics to predict likelihoods of success in future situations.

Information about interactions between different robots may be provided to a server system over a communication network, and the server system can use the data from different interactions to further train and refine the interaction prediction model. The server system may distribute updates to the interaction prediction model to various robots. In addition, or as an alternative, robots may communicate with the server system to provide sensor data to the server and receive scores and predictions from the server system, rather than running the interaction prediction model locally at each robot.

One innovative aspect of the subject matter described in this specification is embodied in methods that include the actions of: receiving, by the one or more computing devices, sensor data describing an environment of a robot; detecting, by the one or more computing devices, a person in the environment of the robot based on the sensor data; generating, by the one or more computing devices, scores indicative of properties of the detected person based on the sensor data; processing, by the one or more computing devices, the scores using a machine learning model to obtain one or more outputs indicative of a likelihood that the detected person will perform a predetermined action in response to communication from the robot, wherein the machine learning model has been trained using sensor data describing different people in proximity to one or more robots and outcomes of communications initiated by the one or more robots; and based on the one or more outputs of the machine learning model, causing, by the one or more computing devices, the robot to initiate communication with the detected person.

In some implementations, receiving the sensor data includes receiving sensor data from one or more sensors of the robot, the one or more sensors comprising at least one of a camera, a microphone, a LIDAR module, or a radar module.

In some implementations, the method includes obtaining, by the one or more computing devices, data indicating a desired human-robot interaction. Processing the feature scores using the machine learning model includes: providing the data indicating the desired human-robot interaction to the machine learning model; or using the data indicating the desired human-robot interaction to select the machine learning model from among multiple machine learning models each trained to indicate a likelihood of a person engaging in a different type of human-robot interaction.

In some implementations, the predetermined action is to assist the robot by manipulating a physical object. Causing the robot to initiate communication with the detected person includes causing the robot to output a request, directed to the detected person, for the detected person to assist the robot by manipulating a physical object.

In some implementations, causing the robot to initiate communication includes causing the robot to: turn to face the detected person; travel closer to the detected person; offer assistance to the detected person; offer a good or service to the detected person; navigate around a person; or stop or slow movement of the robot in anticipation of receiving a command.

In some implementations, the method includes: detecting multiple people that are currently in the environment of the robot based on the sensor data; determining, for each person of the detected multiple people, a set of scores indicating properties of the person based on the received sensor data; processing the sets of scores for the detected multiple people using the machine learning model to obtain, for each of the detected multiple people, one or more outputs indicative of a likelihood that the detected person will perform a predetermined action in response to communication from the robot; and selecting a person, from among the detected multiple people, based on the outputs of the machine learning model for the detected multiple people. Causing the robot to initiate communication with the detected person includes causing the robot to initiate communication with the selected person.

In some implementations, the method includes identifying a particular action for a person to perform. Selecting the person includes selecting a person, from among the detected multiple people, determined to have a highest likelihood of performing the particular action in response to interaction with the robot. Causing the robot to initiate communication with the selected person includes causing the robot to request that the selected person perform the particular action.

In some implementations, generating the scores indicative of properties of the detected person based on the sensor data includes generating scores indicating movement of the detected person, a pose of the detected person, a location of the detected person, and an expression of the detected person.

In some implementations, generating the scores indicative of properties of the detected person based on the sensor data includes generating scores indicating at least one of: a speed of the detected person, a direction of movement of the detected person, an acceleration of the detected person, a destination of the detected person, a facial expression of the detected person, a mood of the detected person, a direction the detected person is facing, a gaze direction of the detected person, a gaze duration of the detected person, a gesture of the detected person, an activity of the detected person, a measure of availability of the detected person, a physiological parameter of the detected person, whether the detected person is speaking, or a physical pose of the detected person.

In some implementations, the scores include scores indicating properties of the detected person determined from a series of sensor measurements captured at different times.

In some implementations, the method includes generating robot scores indicating one or more properties of the robot while the detected person is in the environment of the robot, the robot scores indicating at least one of: a pose of the robot, a location of the robot, movement of the robot, an expression of the robot, an activity of the robot, or an output of the robot. The one or more outputs of the machine learning model are generated by processing the robot scores in addition to the scores indicative of properties of the detected person.

In some implementations, the method includes causing the robot to perform an action involving a movement by the robot or a visible or audible output by the robot. Receiving the sensor data includes receiving sensor data for a time period before the robot performs the action and a time period after the robot performs the action. Generating scores indicative of properties of the detected person based on the sensor data includes generating scores indicating (i) properties of the detected person present before the robot performs the action and (ii) properties of the detected person after the robot performs the action.

In some implementations, the method includes: determining a direction of travel for the robot based on the one or more outputs of the machine learning model; and causing the robot to travel in the direction.

In some implementations, determining the direction of travel includes determining a direction of travel that moves the robot closer to the detected person based on determining that the one or more outputs of the machine learning model indicate at least a threshold likelihood that the detected person will perform a predetermined action in response to communication from the robot. For example, the robot can travel in a direction that brings the robot closer to a current position of the detected person, or closer to an estimated future position of the detected person inferred from the detected person's current or recent movement. Other types of travel can also be set for the robot. As another example, the robot can travel away from one or more people determined to have a low likelihood of successfully engagement based on the model outputs. As another example, the robot can travel toward one or more people determined to have a low likelihood of successfully engagement based on the model outputs. As another example, if the model output is determined to represent a sufficiently high likelihood (e.g., above a threshold), the robot can travel in a direction and speed substantially the same the detected person, to follow or keep pace with the detected person.

In some implementations, the method includes, before causing the robot to initiate communication with the detected person, repeating a set of operations comprising: obtaining additional sensor data, generating additional scores indicating properties of the detected person based on the additional sensor data, processing the additional scores using the machine learning model to generate additional output corresponding to the detected person, and evaluating the additional output of the machine learning model. The method also includes determining that one or more of the additional outputs of the machine learning model satisfies a threshold. Causing the robot to initiate communication with the detected person is performed in response to determining that the additional output satisfies the threshold.

In some implementations, the machine learning model includes a neural network, an autoencoder, a support vector machine, a decision tree, or a maximum entropy classifier.

In some implementations, the one or more computing devices are computing devices of the robot.

Another innovative aspect of the subject matter described in this specification is embodied in methods that include the actions of: receiving, by the one or more computing devices, sensor data corresponding to human-robot interactions in which a robot attempted to obtain assistance from a human to perform an action; receiving, by the one or more computing devices, result data indicating whether each of the human-robot interactions resulted in a human assisting a robot to perform the action; training, by the one or more computing devices, a predictive model based on the sensor data and the result data to indicate, in response to input data describing a human near a robot, a likelihood that the human will perform the action if the robot initiates communication with the human; and providing, by the one or more computing devices, the predictive model to a robot, the robot being configured to use the predictive model to select people to interact with to perform the action.

Advantageous implementations can include one or more of the following features. For example, a robot can conserve limited battery power by selectively engaging communication with people nearby. Actions of the robot to initiate communication, including movement of the robot, can be deferred or avoided until a person having at least a minimum likelihood of successfully completing an action, such as assisting the robot, are identified. Thus, the machine learning models discussed below can allow a robot to avoid expending energy in interactions that are unlikely to result in the completion of a task or other desirable action. In a similar manner, the machine learning models can allow a robot to more quickly complete tasks involving human-robot interaction more quickly. Rather than expend time through various attempted interactions that are likely to be unsuccessful, the robot may avoid delay by initially selecting one or more people that are most likely to be willing and capable of performing the action desired.

As another example, the models for selective interaction can increase the capability of a robot, as an autonomous agent, to accomplish objectives and carry out multi-step plans. Effective selection can allow a robot to achieve tasks the robot is not physically capable of achieving. For example, a robot that does not include a robotic arm may nevertheless achieve an objective of loading or unloading an item by selecting an appropriate volunteer to assist the robot. The models can account for observed factors that signal a person's availability and interest in assisting the robot, This capability can also help the robot deal with unforeseen scenarios, for example, in which a robot's task encounters difficulties or requirements that the robot is not programmed or not able to overcome. In general, the improved selection of people to approach and interact with discussed in this document can increase likelihood of task completion by the robot, reduce the amount of time to complete tasks, and The techniques in this document also allow a robot to better operate among groups of people. When groups of people are present, it may be challenging for some robots to attract the attention and assistance of individuals nearby, especially when people are quickly coming and going or are distracted by headphones, mobile devices, and their various activities. The varying trajectories of people in groups and the changing sets of people may confuse some robots and result in failed attempts at interaction. The models discussed below can assist a robot to select a specific individual to communication with, as well as select a time when the person is most likely to respond to communication, e.g., when the user is looking toward the robot and distractions are limited. In addition, the techniques can be used to limit disruption to the activities of other people nearby. For example, the robot may set a path of motion based on the results of interaction prediction models to approach one or users likely to assist the robot. In addition, or as an alternative, the robot can use results of the models to avoid interacting with people who are determined to be less likely to assist the robot or to be unlikely to be interested in interacting with the robot.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
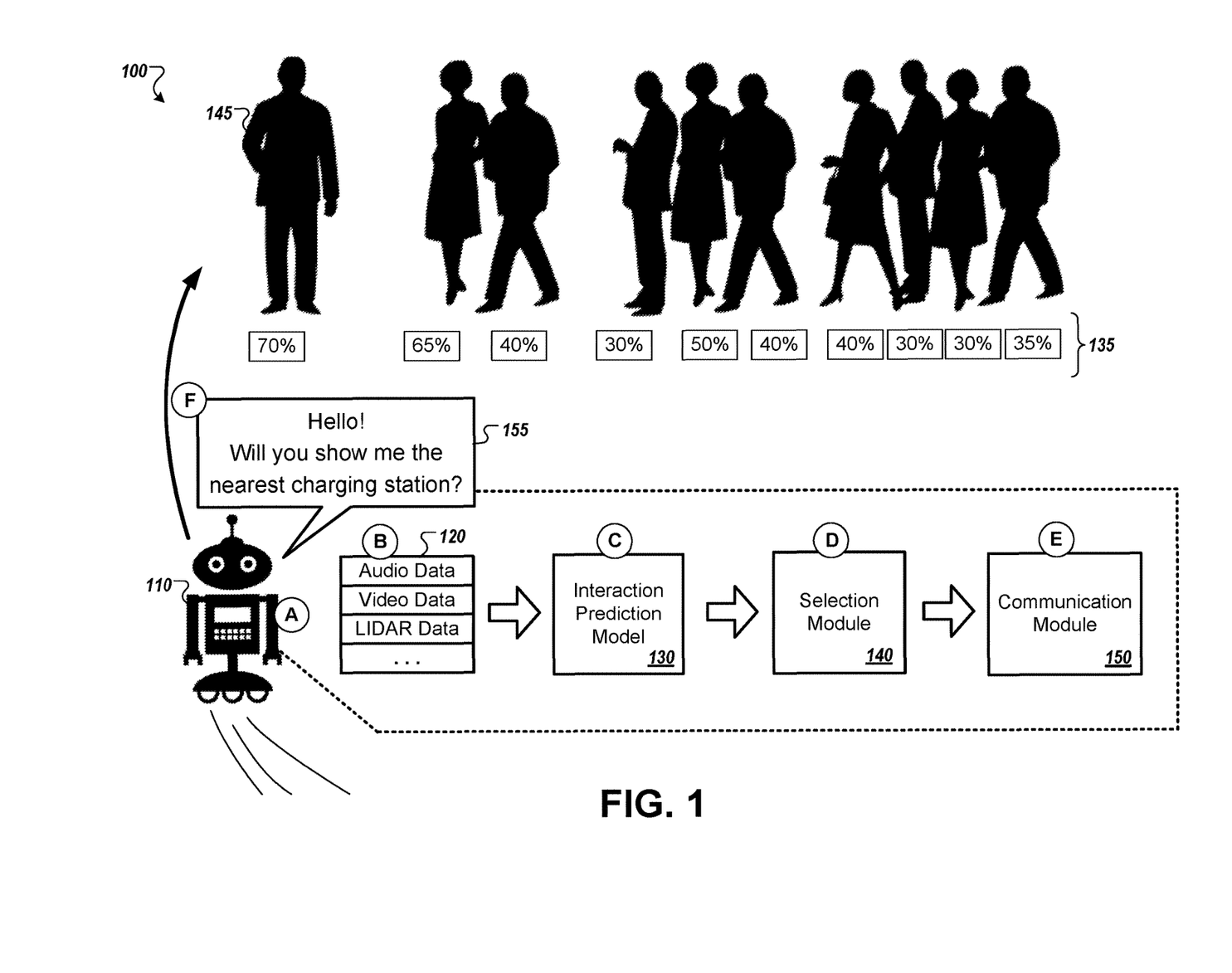
FIGS. 1 and 2 are diagrams that illustrate examples of systems for selective human-robot interaction.

FIG. 1 is a diagram that illustrates an example of a system 100 for selective human-robot interaction. The system 100 includes a robot 110 that uses an interaction prediction model 130 to select people to communicate with. For example, the robot can use the model 130 to assess likelihoods that different people will successfully complete an action in response to communication by the robot 110. FIG. 1 also indicates stages (A)-(F) which indicate a flow of data and actions of the robot 110.

In the example of FIG. 1, the robot 110 is located near a group of people 105. The robot 110 identifies an action for a person to perform, and evaluates data describing the people 105 using the interaction prediction model 130. The robot 110 then uses the output of the model 130 to select a particular person from among the group of people 105. For example, the robot selects the person that the model 130 indicates has the highest likelihood of successfully performing the action. The robot 110 then directs a communication to the selected person to prompt the person to perform the action.

The robot 110 can be a stationary robot or a mobile robot. In some implementations, the robot includes a propulsion system including a mechanism for the robot to travel from one location to another. For example, the robot 110 may include wheels, legs, a continuous track system, or other powered mechanism that the robot 110 may use to travel. The propulsion mechanism may be powered by a battery, fuel cell, solar cell, combustion engine, or other power source. The robot 110 can include a navigation system and various sensors to aid the robot in moving within an environment. Whether the robot 110 has the ability to travel or not, the robot 110 may include other movable components or tools, such as one or more robotic arms or movable sensor assemblies.

The robot 110 can include a variety of input and output mechanisms that allow the robot 110 to communicate with humans and with other robots or devices. For example, the robot 110 can include sensors such as a microphone, a camera (e.g., a monochrome camera, a color (RGB) camera, a color and depth (RGBD) camera, and/or an infrared camera), a touch screen, a touch sensor, a LIDAR module, a radar module, a pressure sensor, an accelerometer, a GPS receiver, etc. Examples of output devices of the robot 110 include a display screen, a lighting element, a movable component, and a speaker. The robot 110 may include communication subsystems, such as a wireless network interface (e.g., WI-FI, BLUETOOTH, and/or cellular interfaces), a radiofrequency transceiver, an optical transceiver, and/or other communication interface.

The people 105 shown in FIG. 1 may represent people located indoors or outdoors, for example, at a park, on a sidewalk or hallway, in a store, in an airport, or any other appropriate area. The people 105 are located in an environment of the robot 110, for example, in proximity to the robot 110 so they can be detected by a camera or other sensor of the robot 110. In some situations, the people 105 may be moving in different ways. For example, some may be stationary, while others may be moving in various different directions.

In general, different people may have very different preferences and levels of interest for interacting with a robot. In addition, the current context of a person can affect whether the person is interested in interacting at a given time. For example, a tourist exploring a city and a worker hurrying to a meeting may have very different levels of interest in stopping and communicating with a robot. Other factors can also affect a person's disposition for human-robot interaction, such as the location of a person (e.g., shopping mall, office building, train station, public park, etc.), distance and position of the user is from a robot, the mood of the person, the current activity of the person (e.g., talking, eating, walking, listening to music, etc.), the time of day, and/or the current weather conditions. These factors may affect different people in different ways. Similarly, the location and activities of a person may vary moment by moment, resulting in a range of differing levels of interest or likelihood in assisting a robot over a relatively short time.

Because interest and availability for human-robot interaction varies from one person to the next, and even varies for an individual person over time, machine learning models are developed to provide real-time or substantially real-time indications of a user's disposition for communication. Not only can the machine learning model indicate a user's disposition to communication, the machine learning model can learn the capability to predict a likelihood that interaction initiated by the robot 110 will result in a specific type of action by a person, e.g., orienting the robot, loading an object onto or unloading an object from the robot, providing a desired type of information, and so on. Thus, when the robot 110 is in proximity to a person, the robot 110 can use the model to determine whether initiating communication will likely result in the person performing a desired action, and at what point initiating communication would provide an acceptable likelihood of success. Similarly, when multiple people 105 are near the robot 110, the model can be used to select the person most likely to assist the robot 110 with the needed action.

In the example of FIG. 1, in stage (A), the robot 110 identifies a target action for a person to perform. The target action may be identified in response to determining that an objective of the robot 110 requires or would be facilitated by performance of the target action. The target action may be an action of a person that helps the robot 110 achieve an objective or complete a task or other activity of the robot 110. In some instances, encouraging a person to perform the target action may be the objective of the robot. In other instances, the target action may be an intermediate step needed for the robot 110 to carry out an objective that does not necessarily involve human-robot interaction. For example, the robot 110 may be assigned to retrieve an object and transport it to a destination. However, on arriving at the pick-up location, the robot 110 may not be able to identify the object needed, or the object needed may be inaccessible (e.g., on a shelf too high for the robot 110 to reach). Upon detecting that the needed object is not available, the robot 110 may determine that assistance from a person to locate or provide the item, and this can be identified as the target action for a person to perform.

In general, a wide variety of actions may serve as a target action. Some target actions may involve physical manipulation of an object by a human, for example, clearing an obstacle for the robot 110, loading or unloading an object, or procuring an object. Some target actions may involve information exchange between the robot 110 and a person, either for the robot 110 to disseminate certain information to the person, or for the human to provide certain information to the robot 110. For example, the robot 110 may request navigation directions from a person, or request a user to indicate a status of the robot 110 or other system. Other types of target actions, such as completing a transaction, taking an action with a person's mobile device, or communicating with a third party, may be identified as target actions. The robot 110 may indicate the target action explicitly (e.g., through a direct request), or may not explicitly indicate the target action.

As additional examples, the target action may be an action that the robot 110 is not capable of performing. For example, the robot may determine that it lacks physical capability (e.g., height, strength, dexterity, tools, etc.) needed to perform the action, or the robot's programming may not enable the robot 110 to perform the action. The target action may be an action that is needed to maintain or recover operability of the robot 110, for example, to move a robot that has fallen over or is stuck on rough terrain, or to guide the robot to a charging station.

In the example of FIG. 1, the robot 110 determines that its battery charge is low, and that it cannot identify a charging station nearby. In response, it identifies a target action of a person indicating the location of a charging station to the robot 110.

In stage (B), the robot 110 acquires sensor data 120 using one or more sensors. For example the robot 110 may include a microphone to capture audio data, a camera to capture video data, a LIDAR module and/or radar module to capture motion and location data, and/or other types of sensors. The sensor data 120 can indicate the presence of the various people 105 in proximity to the robot 110. As discussed further below, the robot 110 can use the sensor data to detect the individual people near the robot 110, within a predetermined range that is appropriate for audio communication, visual communication, or other communication.

In stage (C), the robot 110 provides information from the sensor data 120 to the interaction prediction model 130. The model 130 can evaluate the potential of each of the detected people 105 to assist the robot 110 by performing the target action. The model 130 can be a machine learning model that has learned, through examples of attempts by robots to interact with people and the results of those attempts, to evaluate the observed properties of the people 105 and indicate likelihoods that the different people 105 will perform the target action identified by the robot 110. The interaction prediction model 130 can be trained based on interactions and observations of robots with people in a variety of settings. The model 130 is configured to indicate likelihood scores given contextual data, such as scores derived from the sensor data 120 which indicate movement, location, expressions, and other data about a person.

The model 130 may provide outputs 135 indicative of a likelihood that each person will successfully assist the robot. For example, when each individual person is detected, the sensor data 120 collected by the robot 110 maybe segmented or pre-processed to isolate data sets that each represent properties of an individual person. Scores or portions of the sensor data 120 corresponding to a specific person can be provided to the model 130 to generate a score 135 for that person. In FIG. 1, the scores 135 are illustrated as probability measures, for example, that the person 145 has a 70% likelihood of successfully performing the target action if requested by the robot 110. The scores 135 may be any appropriate type of value to convey likelihood information, for example, binary indications whether people are likely or unlikely to perform the target action, a probability distribution, a relative indication whether one person is more likely to perform the target action than another, multiple values for an individual showing different likelihoods for different types of communications by the robot 110, and so on. Scores 135 may take any of various forms, e.g., a number, a classification, a label, a value on a discrete or continuous scale, etc.

The process of providing sensor data to the interaction prediction model 130 and obtaining output scores 130 can be repeated, or performed concurrently, for each of the different people 105. In addition, as new sensor data is received, updated data is provided to the model 130 to generate updated scores. As a result, as the people 105 move closer to the robot 110 or farther away, and as there activity and expression changes, the robot 110 adjusts the scores 135 to obtain a substantially real-time measure of the likelihood that each of the people 105 will assist the robot 110 if contacted at that time.

In stage (D), a selection module 140 selects a specific person 145, from among the people 105 detected by the robot 110, to communicate with and encourage to perform the target action. The output scores 135 of the model 130 are provided to the selection module 140, which selects a person based on the scores 135. For example, the selection module 140 can identify which person the scores 135 indicate to have the highest likelihood of successfully completing the target action if requested by the robot 110. The selection module 140 can also determine whether the likelihood indicated for a particular person satisfies at least a minimum threshold, for example, a minimum 50% likelihood of success. If the likelihood does not satisfy the minimum threshold, the robot 110 may decline to communicate with the person 145, for example, waiting until a person having a higher likelihood score is identified.

In stage (E), a communication module 150 of the robot 110 determines a communication to provide to the selected person. The communication may be, for example, a message for text-to-speech output by the robot 110, images or text to display on a screen of the robot, sounds to output by the robot 110, or expressions or gestures for the robot 110 to make. The communication module 150 may also communicate with other subsystems of the robot 110, for example, to cause the robot 110 to face the selected person 145 and/or move toward the selected person 145.

In example of FIG. 1, the communication module 150 receives the information indicating the target action, e.g., providing directions to a charging station, and generates a synthesized speech output to greet the selected person 145 and request assistance locating the charging station. The robot 110 also sets a course to approach the person 145.

In stage (F) the robot 110 initiates communication with the selected person 145 in the manner determined by the communication module 150. For example, the robot travels along the determine course of travel to move closer to the person 145, and outputs the synthesized speech output to greet the selected person and request assistance in finding the charging station. The communication of the robot 110 may be directed to the selected person 145 in a number of ways. For example, the robot may turn to face the selected person 145, move into a line of sight of the person, address the person with an appropriate title, follow the person, produce a visible output with lights, screens, or movements of the robot 110 when the selected person's attention is detected to be directed toward the robot 110, and so on.

The techniques discussed above can also be used to facilitate communication or engagement in other ways, besides directly initiating communication. For example, in some implementations, based on the scores 135 the robot 110 can determine to navigate around someone (e.g., a person having a score 135 indicating a low likelihood of successful engagement), or to stop in anticipation of receiving a command.

After requesting input and assistance from the selected person, the robot 110 may provide and store data indicating the results of the attempted interaction. The sensor data 120 and the data indicating whether the target action was successfully completed, as well as the type of interaction requested, may be used to further refine the interaction prediction model 130. This data may be used to update the model 130 for the particular robot 110, and/or maybe provided to a server system to update one or more models used by other robots.

The processing indicated for the interaction prediction model 130, the selection module 140, and the communication module 150 may reside locally on the robot 110, may be performed by a remote computing system in communication with the robot 110, or may be performed in part by the robot 110 and in part by a remote system. The robot 110 can include one or more computing devices, e.g., hardware processors and memory storing instructions executable by the processors. Software corresponding to the elements 130, 140, 150 and other functionality of the robot 110 can be stored locally at the robot 110 and may be updated from time to time by a remote computing system.

Figure 2:
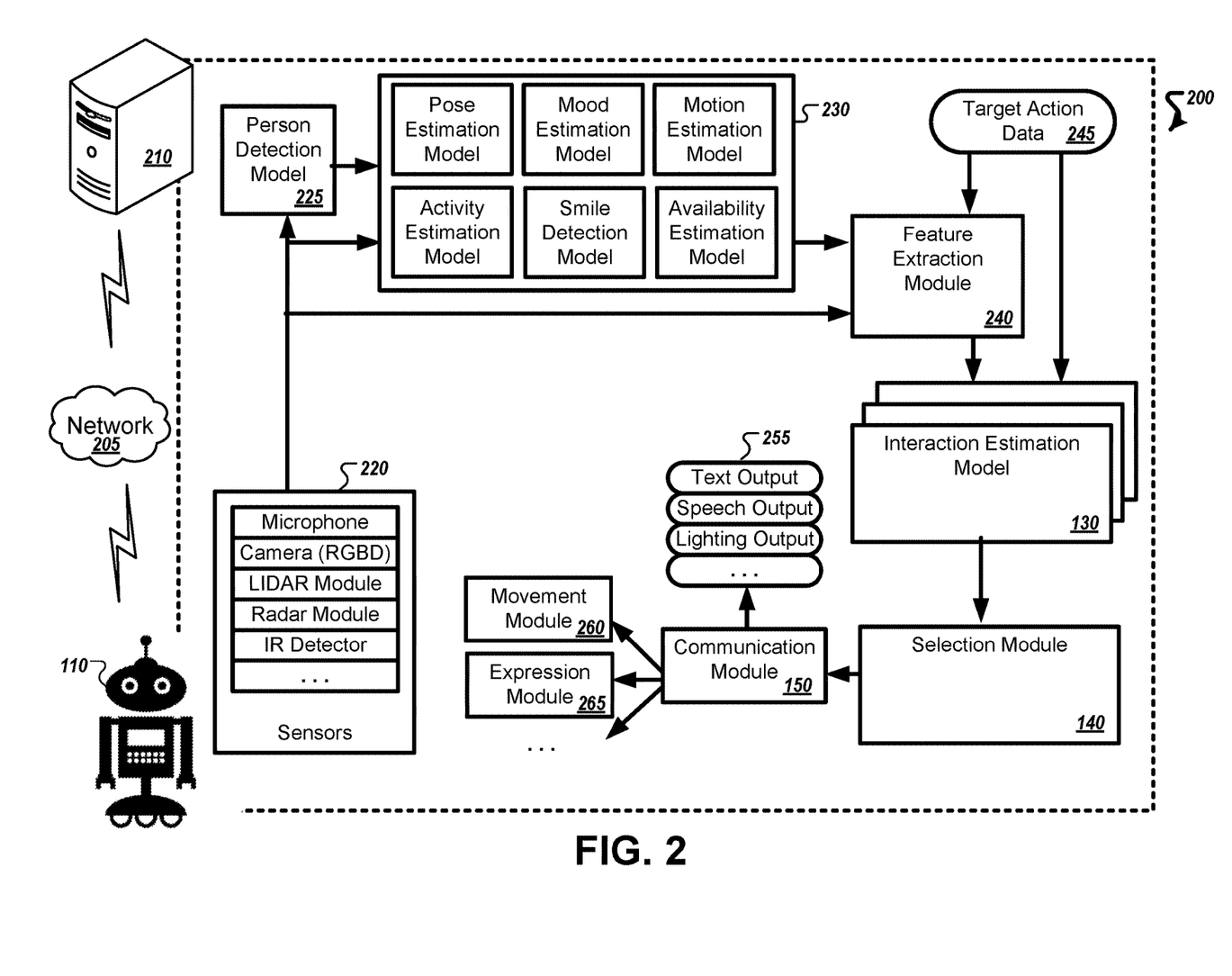

FIG. 2 is a diagram that illustrates an example of a system 200 for selective human-robot interaction. The system 200 includes the robot 110, a server system 210, and a network 205. The system 200 also shows various processing modules and machine learning models, which may be stored on and used by the robot 110, the server system 210, or a combination of both.

The robot 110 includes a variety of sensors 220 which enabled the robot 110 to obtain information regarding in the environment of the robot 110. Examples of these sensors 220 include a microphone, camera, and LIDAR module, a radar module, and infrared detector. Other sensors, such as a GPS receiver, accelerometers, force sensors, can indicate the current context of the robot 110.

Data from the sensors 220 is provided to a person detection model 225. This model 225 is configured to identify individual people in the environment of the robot, e.g., a predetermined range around the robot. For example the person detection model 225 may apply shape recognition and motion recognition algorithms to detect people in a field of view of a camera of the robot 110. Similarly, shape matching, pattern matching, and other techniques can be used to process radar data, LIDAR data, and other sensor data to detect individual people. As another example, one or more microphones of the robot 110 made the text speech and other sounds from people in the environment of the robot. As another example, and infrared detector may indicate radiant or reflected infrared signals representing people near the robot 110. The sensor data for the various sensors may be time-stamped or synchronized so that different types of sensor data can be mapped together to indicate different observed parameters that occur at the same time.

The sensor data and outputs of the person detection model 225 may be provided to one or more models 230 that characterize aspects of the detected people. These models may be machine learning models, such as neural networks, that have been trained to identify particular aspects of a person's behavior. Some models may be rule-based models or other models for extracting certain types of information from the sensor data.

For each detected person, the robot 110 can label or isolate the sensor data representing that person. For example, image or video data can be labeled or masked to identify the portions of an image frame representing a specific person. This data can be used to determine a pose, mood, activity, expression, or other properties of the detected person. For example, the physical pose of a person may include skeletal joint angles of the person, as determined through any of various means, such as shape matching, estimation by a neural network model, etc. The pose of a person can be very predictive of a person's activity, availability, and attitude. Accordingly, inferring the physical pose or posture of a person, whether for the body as a whole or for specific regions such as arms, legs, hands, etc., can provide valuable information to interaction prediction models. A physical pose may not correspond to a particular activity, nor does the activity type need to be determined.

As a few examples, the models 230 may include a pose estimation model which provides outputs indicating a direction a person is facing, a gesture, or position of the person's body. As another example a mood estimation model may take into account various parameters to estimate whether a person is happy, sad, angry, etc. As another example, a smile detection model can assess images of a person's face to determine if the person is smiling. In some implementations, a neural network may be trained to act as a smile detection model and process features of images of a person's face. The activations at a hidden layer of the neural network, such as the activations at a final hidden layer before an output layer or softmax layer of the neural network, can be used as a representation of a person's mood.

In a similar manner, models may indicate other aspects of body language or facial expression. The models 230 can include a motion estimation model that estimates a speed of travel of the person, a direction of travel of the person, acceleration of the person, a level of variation of movement of the person, and other parameters. This data may be generated from radar or LIDAR outputs, and/or may be estimated from changes in position of the person across multiple images, such as in a video segment.

The models 230 may also include an availability model which estimates a level of availability of a person. This may represent a type of sensory availability, such as an ability to receive and process audio or visual data. For example, a level of background noise detected by the microphone may affect a level to which a person may respond to audio communication. Similarly the auditory availability of a person may be estimated using images of the person, which may show the use of headphones or may show that the person is engaged in conversation with other people, which would indicate low availability for to process or pay attention to audio output from the robot 110. In a similar manner, if a person is carrying items, the person may have a low tactile availability to assist with a physical task. As another example, a person may have a low visual availability if images show the person reading, or resting with closed eyes, or looking away from the robot 110. In general, activities of a person and distractions near the person, including whether the person is using a mobile device, may be detected and used to estimate the availability of a person for different types of action or communication. In some instances, the activity estimation model is used to estimate a type of activity or person is engaged in, e.g., walking, running, speaking, reading, listening to music, etc.

In addition to the models illustrated, other models may be used. For example a gaze tracking module can assess the sensor data to determine a direction that a person is gazing, and a duration that the person's gaze has remained there. This information can be particularly useful to determine a person's potential interest in the robot 110.

In addition to determining the current properties of a person given the sensor data and the various models 230, information about changes in the activities, motion, expression, and other properties while the person is in the environment of the robot 110 can be tracked. The sensor data can be synchronized or aligned with data indicating actions of the robot 110, allowing the system 200 to determine how a person's behavior changes in response to a robot action. Scores indicating whether a person changes behavior in response to a robot action, and a type of change and magnitude of change, can be generated. This information can indicate whether a person is paying attention to the robot 110, and whether the person would be inclined to interact with the robot 110. For example, when the robot 110 performs a movement or changes the light display, some people may look toward the robot 110 or move closer to it, while other people may ignore the robot 110, and still other people may react by moving away from the robot 110. Similarly, changes in a person's detected mood, facial expression, or body language detected through sensor data tracked over time can indicate whether a person has a positive or negative disposition toward the robot 110. Accordingly, the data provided to the model 130 can include features that represent a series or pattern of actions, including changes in behavior or expression of a person. These various scores and determinations provide useful information that the interaction estimation models 130 use to estimate results of interactions learn the appropriate weighting of signals through machine learning techniques such as reinforcement learning.

The system 200 includes a feature extraction module 240 which can receive outputs of the models 230 as well as receive the sensor data and generate scores to provide to the interaction estimation model 130. Target action data 245 is also used. For example, depending on the target action the robot 110 has identified for a person to perform, a different set of inputs may be appropriate. Similarly different interaction estimation models 130 may be used for different types of target actions. For example, one model may be used for assessing likelihoods of successful interactions that involve verbal communication, another model may be used to assess likelihood of success for a person to complete a physical task, and another bottle may be used to assess the likelihood of a person traveling with the robot to a different location. That target action identified by the robot 110 can be used to select the appropriate interaction estimation model 130, as well as set the appropriate feature scores to be generated and provided to the selected interaction estimation model 130. Further, in some implementations, the interaction estimation model 130 may be trained to account for variations due to the type of target action requested. In these implementations, scores indicating the type of target action can be provided to the model 130 directly as an input along with other feature scores representing the environment of the robot 110 and detected people.

The interaction estimation model 130 processes the received scores. For example, different sets of scores may be provided to the model 130, with each set of scores describing a different person in the environment of the robot 110. For each of these input data sets, the interaction estimation model 130 outputs one or more scores indicating a likelihood that the corresponding person will successfully perform the target in action. Periodically, e.g., once a second, once every five seconds, etc., new scores representing newly elected sensor data about a person may be provided to the interaction estimation model 130, allowing the model 130 to provide a new score for the likely outcome of attempting interaction with the person. In this matter, the system 200 can provide predictions that correspond to the movement and changes in activity of people near the robot in substantially real time.

In general, the models 230 and the model 130 may use information representing individual measurements and/or multiple measurements. For example, some information may be extracted from a single image frame, while other information may be extracted from a series of image frames captured by the robot. In this sense, trailing data, e.g., indicating a recent history of any of the features, measurements, classification decisions, or model outputs, can be used in addition to or instead of current values. In particular, features determined by the feature extraction module 240 can be based on historical information rather than single sensor frames. For example, features may be determined based on data captured in a particular amount of time, e.g., the previous second, previous 5 seconds, previous minute, etc., or based on a number of measurements, e.g., the previous 5 measurements, the previous 50 measurements, etc. Other features may be determined using the overall sequence of data captured by the sensors. For example, a feature could indicate an amount of time a person has been in view or in proximity of the robot.

In addition to using features about one or more detected people, the model 130 can also receive and process input data indicating properties of the robot 110, such as pose, location, velocity, expression, etc. of the robot. This information may indicate a current values that describe the present state or actions of the robot 110, and/or the information may indicate previous properties of the robot 110, e.g., indicating earlier actions or state of the robot that a person nearby may have observed.

As discussed above, the selection module 140 receives the scores for various different people and selects one of the people for the robot 110 to initiate communication with. The selected person can be the person that the outputs of the model 130 indicate has the highest likelihood of performing the target action. Notably, the outputs of the interaction estimation model 130 may not merely represent whether a person will interact with the robot 110. Rather, in some implementations, the scores may indicate whether a particular desired result separate from human-robot interaction is achieved. Thus, the outputs indicate predicted measures of success in completing the target action or task, which can be an action that involves more than simply the initiation of communication between the robot 110 and the person.

The selection module 140 indicates the selected person to the communication module 150. The communication module 150 then adjust one or more output parameters of the robot to initiate communication with the selected person. This can involve in various outputs 255, such as text output displayed on the screen of the robot 110, speech output provided by a speaker of the robot 110, output of lights or other indicators visible on the robot 110, and so on. The communication module and/or the selection module 140 communicate with other modules of the system 200 to further adjust the actions of the robot 110 to engage the selected person. For example, based on a location of the selected person relative to the robot 110, a movement module 260 can plan a path and speed to position the robot for communication with the selected person. This may involve turning the robot 110 to face the person, moving the robot into view of the person, increasing or decreasing speed of travel of the robot 110 to intersect a trajectory of the person, and so on. Similarly, an expression module 265 can be used to alter an expression of the robot 110. For example, the robot 110 can change its appearance to with an inquisitive expression, e.g., by tilting a camera module if the robot 110, raising a robotic arm, etc.

The robot 110 may continue requiring sensor data from the sensors 220 as well as track the results of the interaction with the selected person. If the interaction with the selected person results in the target action being completed, the robot 110 may continue its tasks or normal operation. If the interaction is unsuccessful and the target in action is not performed, the robot 110 may assess the likelihood that others other people may assist the robot 110, and initiate communication with those people according to results from the interaction estimation model 130.

Figure 3:
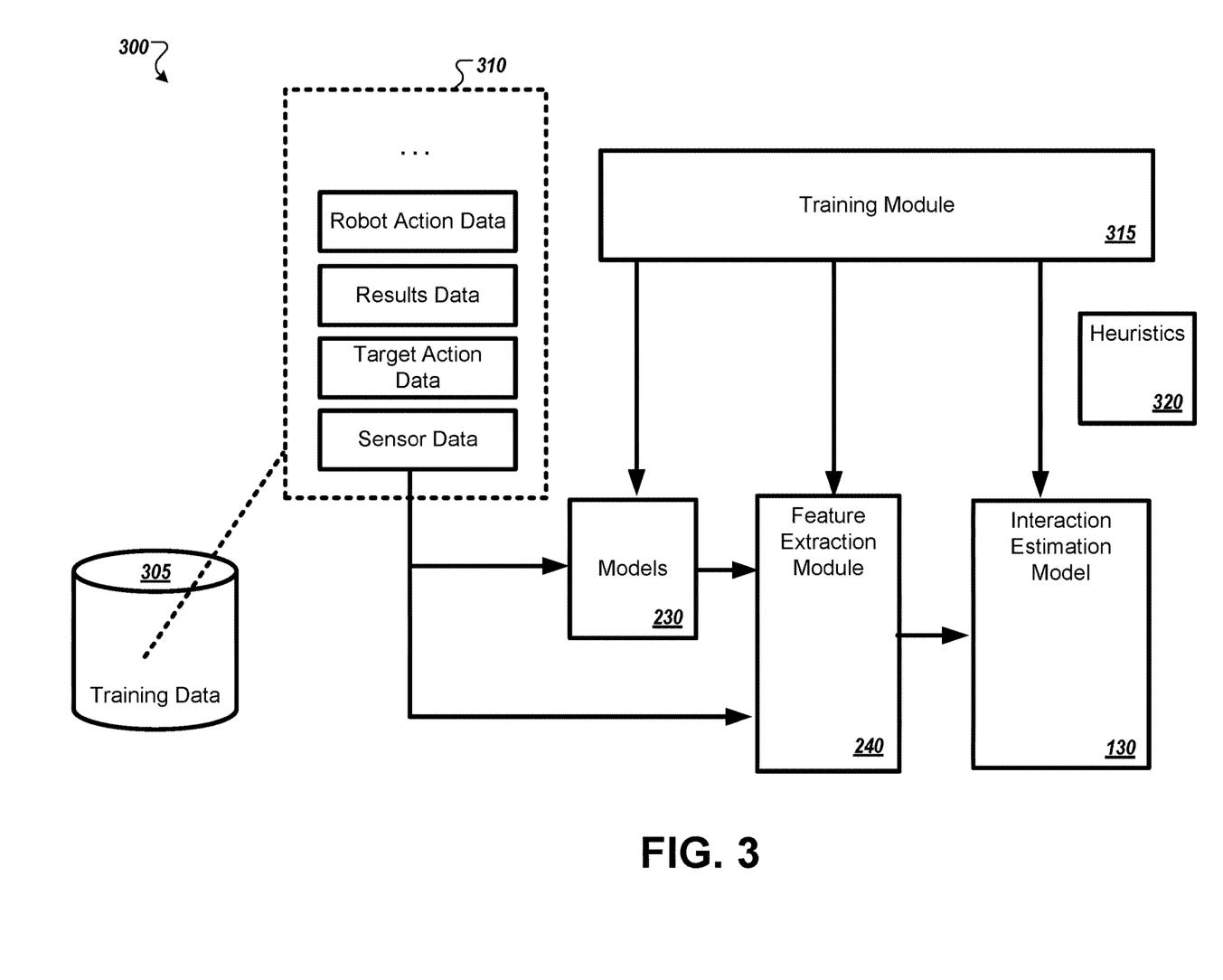
FIG. 3 is a diagram that illustrates an example of a process for training a machine learning model for selective human-robot interaction.

FIG. 3 is a diagram that illustrates an example of a process 300 for training a machine learning model for selective human-robot interaction. To train the interaction estimation model 130, a computing system, such as the server system 210, can access a collection of training data 305. This training data 305 may include examples of successful and unsuccessful attempts at interactions between robots and humans. In some instances, there are collections of examples corresponding to different actions. For example, one collection may include only examples where the target action is to load an item on to a robot. Another collection may include only examples where the target action is to guide a robot in navigation. Each example of training data can include sensor data collected by the robot involved in the interaction, including sensor data recorded before the robot initiated communication. The sensor data may include, for example, video of a person before, during, and after the robot initiates communication in an attempt to complete the target action.

One instance of a training data example is shown as data set 310. This data set 310 includes sensor data acquired by the robot, target action data indicating the desired outcome of the interaction attempt, results data indicating whether the desired action was successfully completed, and robot action data indicating the manner in which the robot moved or provided output over the course of the interaction attempt. Each of these types of information can provide valuable information for training.

The target action data can be used to group training data sets together to tailor a model for a specific type of target action or result to be achieved. In addition, or as an alternative, an interaction estimation model 130 can be trained based on multiple types of desired actions or results, and may receive data indicating the type of target action. Receiving an identifier or other indication of the type of outcome desired can allow the model to learn to discriminate between factors that may be more applicable to one type of target action than another.

The robot action data can be used during training to detect a person's responses to robot actions, and to what extent the person's responses are indicative of the likelihood of the person will then perform the desired action. In addition, the robot action data may indicate the manner in which the robot initiates communication with the person in the interaction. A wide data collection may show that different communication parameters (e.g., communication at different distances, different volume levels, different media types such as through visual or audio output, etc.) are more likely to achieve the desired outcome in certain situations. An interaction estimation model 130 maybe trained with only examples where the robot uses a specific type of interaction, for example, a text-to-speech interface. Other models 130 may be generated to reflect results obtained through gestures, or visual outputs, or high-complexity messages versus low-complexity messages, or combinations thereof. In some instances multiple of these models 130 maybe run to determine, for a given person and the context observed by the sensor data, which type of communication is most likely to produce the desired outcome. Alternatively, rather than using multiple models, a single interaction estimation model 130 maybe used, and outputs of the interaction estimation model 130 may indicate varying likelihoods corresponding to different communication types.

The sensor data can be provided to the models 230 discussed above, and to the feature extraction module 240. Scores output from the feature extraction module 240 are provided to the interaction estimation model 130. A training module 315 may adjust parameters of the models 230, the feature extraction module 240, and the interaction estimation model 130 to effect training of the system. For example, using reinforcement learning, the training module 315 may set a reward or penalty for a given example based on the results data for the training example. For example, the training module 315 may assign a reward favoring selection of a person for which the sensor data indicates a successful interaction occurs. On the other hand, the training module 315 may indicate a lower reward or penalty for indicating a high likelihood of success for a person with whom interaction was attempted, but the attempt did not result in the desired outcome. The particular training algorithm used may vary depending on the type of machine learning model used.

In some implementations, the interaction estimation model 130 includes or is generated using set of heuristics 320. The heuristics 320 may represent rules or policies for interpreting sensor data. As an example, one heuristic may assess motion of a robot and motion of a user. It may indicate that if a person backs away as the robot approaches, a decreased likelihood of successful interaction should be provided. This type of determination based on known for expected signals maybe used to initially operate the model 130. As more training data is acquired, examples may prove or disprove the predictive value of individual heuristics. As a result, data acquired from various robots in different locations maybe used to incrementally update the model 130 and learn which heuristics 320 are most accurately predicting outcomes and which are not. The heuristics 320 may be altered over time based on the increased learning of the system, for example, to remove or alter low-performing heuristics, or to decrease the influence of the heuristics 320 as the model 130 training proceeds and provides more accurate output.

Figure 4:
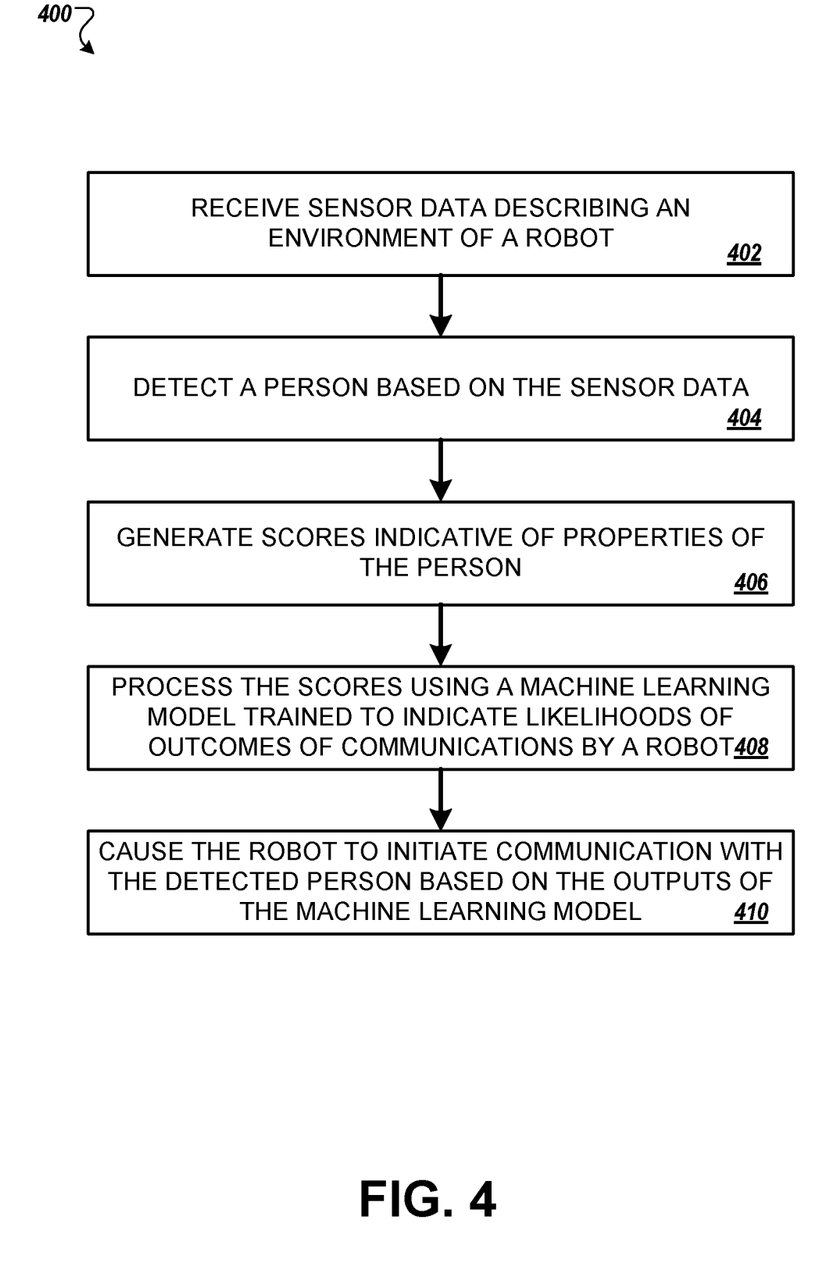
FIGS. 4-5 are flow diagrams that illustrate examples of processes for selective human-robot interaction.

FIG. 4 is a flow diagram that illustrates an example of a process 400 for selective human-robot interaction. The process 400 can be performed by one or more computing devices. For example, the operations may be performed by one or more computing devices of a robot, one or more computing devices that separate from the robot which communicate with the robot over a communication network, or by a combination of computing devices of the robot and other systems. In addition to the features described below, the process 400 can include actions and features as discussed above with respect to FIGS. 1-3.

Sensor data describing an environment of a robot is received (402). The robot may acquire the sensor data using one or more sensors of the robot, such as a camera, a microphone, a LIDAR module, or a radar module.

A person is detected in the environment of the robot based on the sensor data (404). The person may be detected using, for example, face detection, shape detection for a portion of the body other than the face, or pattern recognition indicating changes in positions between different images captured by a camera. Similarly, data indicating three-dimensional positions, such as radar, LIDAR, depth information from a stereo camera, and so on may indicate shapes and volumes that can be determined to represent people.

Scores indicative of properties of the detected person are generated based on the sensor data (406). For example, feature values indicative of the detected person's pose, facial expression, body movement, speed and direction of travel, eye gaze direction, current activity, and/or sensory availability may be generated from the sensor data.

The scores are processed using a machine learning model to obtain one or more outputs indicative of a likelihood of an action of the detected person (408). For example, the outputs can indicate a likelihood that the detected person will perform a predetermined action in response to communication from the robot. The machine learning model can be one that has been trained using sensor data describing different people in proximity to one or more robots and outcomes of communications initiated by the one or more robots.

Based on the one or more outputs of the machine learning model, one or more computing devices cause the robot to initiate communication with the detected person (410). The computing device may also compare the score to one or more thresholds to determine whether at least a minimum likelihood of success is indicated, and initiate communication with the person in response. When multiple people are detected, a computing device can identify a score that indicates the highest likelihood of achieving the predetermined action, and select the detected person corresponding to that score.

In some implementations, the one or more computing devices, obtain data indicating a desired human-robot interaction. This interaction can be a target action that is needed for the robot to achieve an objective of the robot, for example, to maintain proper operating capability of the robot or to obtain a result that allows the robot to proceed with a task. The data indicating the desired interaction can be provided to the machine learning model and used to process the scores indicating characteristics of an environment of the robot. In some implementations, the data indicating the desired human-robot interaction is used to select the machine learning model from among multiple machine learning models each trained to indicate a likelihood of a person engaging in a different type of human-robot interaction.

Figure 5:
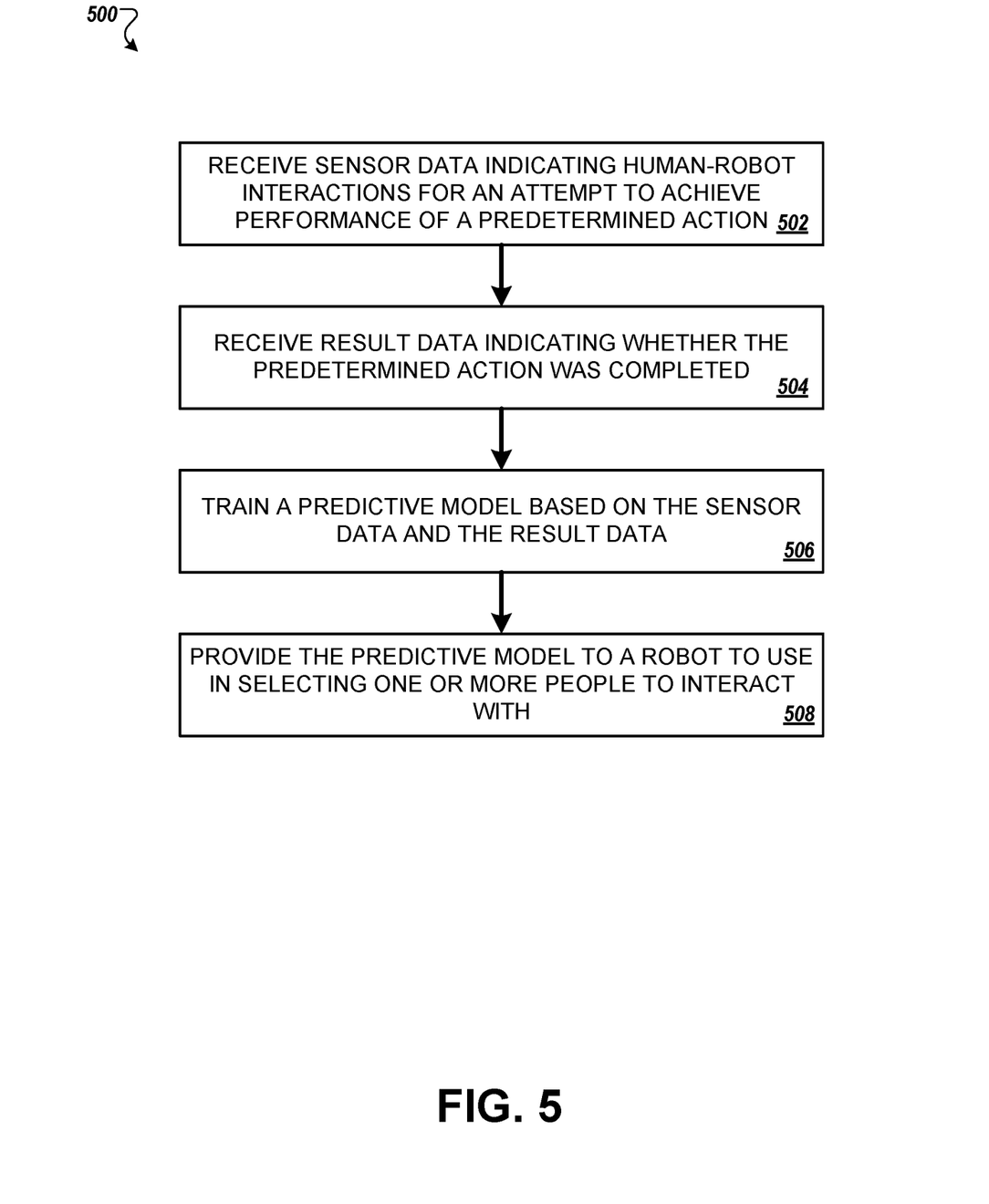

FIG. 5 is a flow diagram that illustrates an example of a process 500 for selective human-robot interaction. The process 500 can be performed by one or more computing devices. For example, the operations may be performed by one or more computing devices of a robot, one or more computing devices that separate from the robot which communicate with the robot over a communication network, or by a combination of computing devices of the robot and other systems. In addition to the features described below, the process 500 can include actions and features as discussed above with respect to FIGS. 1-3.

Sensor data corresponding to human-robot interactions is received (502). The sensor data can indicate interactions in which a robot attempted to obtain assistance from a person to perform an action. The sensor data can be accompanied by data indicating other information related to the interaction, such as the particular action that was targeted, the type of communication initiated by the robot, and so on. In addition to or instead of sensor data, one or more scores derived from sensor data can be obtained. For example, scores indicating how many people were present, activities and attributes of the people present, environmental factors, and other data can be obtained.

Result data is obtained, where the result data indicates whether each of the human-robot interactions resulted in a person assisting a robot to perform the action (504).

A predictive model is trained based on the sensor data and the result data (506). The predictive model is trained to indicate, in response to input data describing a person near a robot, a likelihood that the human will performing the action if the robot initiates communication with the person.

The predictive model is provided to a robot (508). The robot is configured to use the predictive model to select people to interact with to perform the action.

In some implementations, the predictive model is used by a server system to process sensor data sent by one or more robots. For example, robots can provide sensor data to the server system over a network, the server system can process the sensor data using the predictive model, and the server system provides scores indicating likelihood scores for individual people described by the sensor data.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computing devices, the method comprising:
    receiving, by the one or more computing devices, sensor data describing an environment of a robot;
    detecting, by the one or more computing devices, multiple people that are currently in the environment of the robot based on the sensor data;
    for each detected person of the multiple people:
        generating, by the one or more computing devices, scores indicative of properties of the detected person that are determined based on the sensor data;
        providing, by the one or more computing devices, the scores indicative of properties of the detected person as input to a machine learning model to obtain one or more outputs indicative of a likelihood that the detected person will perform a predetermined action in response to communication from the robot, wherein the machine learning model has been trained using examples of sensor data in which each of the examples indicates characteristics of a person in proximity to a robot and an outcome of communication to the person by the robot;
    using, by the one or more computing devices, the outputs of the machine learning model to select a person, from among the detected multiple people that are currently in the environment of the robot, that the outputs of the machine learning model indicate has a highest likelihood of performing the predetermined action in response to communication from the robot; and
    causing, by the one or more computing devices, the robot to selectively initiate communication with at least one of the detected multiple people, wherein selectively initiating communication comprises initiating communication with the selected person and not initiating communication with one or more of the other detected people.

2. The method of claim 1, wherein receiving the sensor data comprises receiving sensor data from one or more sensors of the robot, the one or more sensors comprising at least one of a camera, a microphone, a LIDAR module, or a radar module.

3. The method of claim 1, further comprising obtaining, by the one or more computing devices, data indicating a desired human-robot interaction;
    wherein processing the feature scores using the machine learning model comprises:
        providing the data indicating the desired human-robot interaction to the machine learning model; or
        using the data indicating the desired human-robot interaction to select the machine learning model from among multiple machine learning models each trained to indicate a likelihood of a person engaging in a different type of human-robot interaction.

4. The method of claim 1, wherein the predetermined action is to assist the robot by manipulating a physical object;
    wherein causing the robot to initiate communication with the detected person comprises causing the robot to output a request, directed to the detected person, for the detected person to assist the robot by manipulating a physical object.

5. The method of claim 1, wherein causing the robot to initiate communication comprises causing the robot to:
    turn to face the detected person;
    travel closer to the detected person;
    offer assistance to the detected person;
    offer a good or service to the detected person;
    navigate around a person; or
    stop or slow movement of the robot in anticipation of receiving a command.

6. The method of claim 1, further comprising identifying a particular action for a person to perform;
    wherein causing the robot to initiate communication with the selected person comprises causing the robot to request that the selected person perform the particular action.

7. The method of claim 1, wherein generating the scores indicative of properties of the detected person based on the sensor data comprises generating scores indicating movement of the detected person, a pose of the detected person, a location of the detected person, and an expression of the detected person.

8. The method of claim 1, wherein generating the scores indicative of properties of the detected person based on the sensor data comprises generating scores indicating at least one of: a speed of the detected person, a direction of movement of the detected person, an acceleration of the detected person, a destination of the detected person, a facial expression of the detected person, a mood of the detected person, a direction the detected person is facing, a gaze direction of the detected person, a gaze duration of the detected person, a gesture of the detected person, an activity of the detected person, a measure of availability of the detected person, a physiological parameter of the detected person, whether the detected person is speaking, or a physical pose of the detected person.

9. The method of claim 8, wherein the scores include scores indicating properties of the detected person determined from a series of sensor measurements captured at different times.

10. The method of claim 1, further comprising generating robot scores indicating one or more properties of the robot while the detected person is in the environment of the robot, the robot scores indicating at least one of: a pose of the robot, a location of the robot, movement of the robot, an expression of the robot, an activity of the robot, or an output of the robot; and
wherein the one or more outputs of the machine learning model are generated by processing the robot scores in addition to the scores indicative of properties of the detected person.

11. The method of claim 1, further comprising:
causing the robot to perform an action involving a movement by the robot or a visible or audible output by the robot;
wherein receiving the sensor data comprises receiving sensor data for a time period before the robot performs the action and a time period after the robot performs the action; and
wherein generating scores indicative of properties of the detected person based on the sensor data comprises generating scores indicating (i) properties of the detected person present before the robot performs the action and (ii) properties of the detected person after the robot performs the action.

12. The method of claim 1, further comprising:
determining a direction of travel for the robot based on the one or more outputs of the machine learning model; and
causing the robot to travel in the direction.

13. The method of claim 12, wherein determining the direction of travel comprises determining a direction of travel that moves the robot closer to the detected person based on determining that the one or more outputs of the machine learning model indicate at least a threshold likelihood that the detected person will perform a predetermined action in response to communication from the robot.

14. The method of claim 1, wherein processing the scores using a machine learning model comprises processing a first set of scores to determine a first output of the machine learning model;
further comprising, before causing the robot to initiate communication with the detected person:
determining to not initiate communication with the detected person based on a determination that the first output of the machine learning model does not satisfy a threshold;
repeating a set of operations comprising:
obtaining additional sensor data,
generating additional scores indicating properties of the detected person based on the additional sensor data,
processing the additional scores using the machine learning model to generate additional output corresponding to the detected person, and
evaluating the additional output of the machine learning model; and
determining that one or more of the additional outputs of the machine learning model satisfies the threshold;
wherein causing the robot to initiate communication with the detected person is performed in response to determining that one or more of the additional outputs satisfies the threshold.

15. The method of claim 1, wherein the one or more computing devices are computing devices of the robot.

16. A system comprising:
one or more computing devices and one or more storage devices storing instructions that are operable, when executed by the one or more computing devices, to cause the one or more computing devices to perform operations comprising:
receiving, by the one or more computing devices, sensor data describing an environment of a robot;
detecting, by the one or more computing devices, multiple people that are currently in the environment of the robot based on the sensor data;
for each detected person of the multiple people:
generating, by the one or more computing devices, scores indicative of properties of the detected person that are determined based on the sensor data;
providing, by the one or more computing devices, the scores indicative of properties of the detected person as input to a machine learning model to obtain one or more outputs indicative of a likelihood that the detected person will perform a predetermined action in response to communication from the robot, wherein the machine learning model has been trained using examples of sensor data in which each of the examples indicates characteristics of a person in proximity to a robot and an outcome of communication to the person by the robot;
using, by the one or more computing devices, the outputs of the machine learning model to select a person, from among the detected multiple people that are currently in the environment of the robot, that the outputs of the machine learning model indicate has a highest likelihood of performing the predetermined action in response to communication from the robot; and
causing, by the one or more computing devices, the robot to selectively initiate communication with at least one of the detected multiple people, wherein selectively initiating communication comprises initiating communication with the selected person and not initiating communication with one or more of the other detected people.

17. One or more non-transitory computer-readable media storing instructions that, are operable, when executed by the one or more computing devices, to cause the one or more computing devices to perform operations comprising:
receiving, by the one or more computing devices, sensor data describing an environment of a robot;
detecting, by the one or more computing devices, multiple people that are each currently in the environment of the robot based on the sensor data;
generating, by the one or more computing devices, a set of scores for each of the multiple people based on the sensor data, wherein each set of scores indicates properties of a different person of the multiple people detected to be currently in the environment of the robot;
processing, by the one or more computing devices, each of the sets of scores using a machine learning model to obtain, for each of the detected multiple people that are currently in the environment of the robot, one or more outputs indicative of a likelihood that the detected person will perform a predetermined action in response to communication from the robot, wherein the machine learning model has been trained using examples of sensor data that respectively indicate characteristics of individual people in proximity to one or more robots and outcomes of communications to the individual people that were initiated by the one or more robots;

selecting, by the one or more computing devices, a person from among the detected multiple people that are currently in the environment of the robot based on the outputs of the machine learning model that indicate likelihoods that the respective detected people will perform the predetermined action in response to communication from the robot; and causing, by the one or more computing devices, the robot to selectively initiate communication with at least one of the detected multiple people, wherein selectively initiating communication comprises initiating communication with the selected person and not initiating communication with one or more of the other detected people.

18. The method of claim 1, wherein selectively initiating communication comprises not initiating interaction with detected people for which outputs of the machine learning model do not indicate at least a minimum threshold level of likelihood of the people performing the predetermined action in response to communication from the robot.

19. The method of claim 1, wherein the predetermined action involves a person moving the robot.

20. The method of claim 1, wherein the predetermined action is a task for a person to perform that is separate from interaction with the robot.

* * * * *